United States Patent Office
3,234,283
Patented Feb. 8, 1966

3,234,283
PREPARATION OF TERTIARY AMINES
Harry de V. Finch, Berkeley, and Robert E. Meeker, Orinda, Calif., assignors to Shell Oil Company, New York, N.Y., a corporation of Delaware
No Drawing. Filed May 27, 1963, Ser. No. 283,542
7 Claims. (Cl. 260—583)

The present invention relates to a method for the production of tertiary amines, and more particularly higher alkyl di(lower alkyl) amines.

It is already known to convert alcohols to amines through a reaction with a nitrogen-containing compound in the presence of certain hydrogenation catalysts, see e.g., British 436,414.

Furthermore, processes for the production of oxygenated organic compounds, such as alcohols, from unsaturated hydrocarbons are well known. The so-called Oxo process is widely used commercially for this purpose in the production of aldehydes and alcohols from lower olefins. In the conventional Oxo process, a compound such as cobalt hydrocarbonyl ($HCo(CO)_4$), or dicobalt octacarbonyl ($Co_2(CO)_8$) or some other cobalt compound which gives rise to cobalt hydrocarbonyl, is used as the active catalytic ingredient. Experiments have indicated that the presence of an amine in the reaction zone in substantial amount inactivates the cobalt hydrocarbonyl catalyst and thus substantially impedes the reaction.

It is a principal object of this invention to provide an improved and direct method for the production of tertiary amines from olefins, particularly higher alkyl di(lower alkyl) amines.

It has now been found that the direct synthesis of tertiary amines can be accomplished by the reaction of olefins, secondary amines, carbon monoxide and hydrogen in the presence of certain cobalt carbonyl complexes.

Recent developments have led to improved hydroformylation processes employing certain cobalt carbonyl complexes containing certain other (than CO) ligands such as, for example, electron-donating trivalent phosphorus compounds, e.g., tertiary hydrocarbon phosphines, such as trialkyl phosphines, dialkyl aryl phosphines, alkyl diaryl phosphines and triaryl phosphines. Typical examples of these compounds are tri(ethyl to dodecyl) phosphines, di(methyl to hexyl) phenyl phosphines, methyl to hexyl diphenyl phosphines, diphenyl benzyl phosphine and triphenyl phosphine.

It has now been found that such hydroformylation of olefins employing these catalysts can be carried out in the presence of reactive proportions of secondary amines, preferably lower dialkyl, especially methyl through butyl, under hydroformylation conditions resulting in the direct synthesis of tertiary amines. Such a procedure represents a marked advance in the art since it enables the economic production of valuable amines, particularly in view of the requirement for only one reaction zone.

Briefly stated, the invention broadly contemplates reacting alkenes, preferably having from six to twenty carbon atoms, with carbon monoxide, hydrogen and secondary amine, preferably lower alkyl secondary amine, in the presence of a cobalt carbonyl hydrocarbon phosphine complex as catalyst under carbonylation conditions suitable to form tertiary amines. Under proper conditions, long-chain n-alkyl dimethyl amines can be readily manufactured by a single step hydroformylation-hydrogenation-amination directly from corresponding olefins, having one less carbon atom than contained in the n-alkyl chain, CO, $H_2$ and dimethylamine.

In accordance with a preferred embodiment of the invention, which is set forth for purposes of illustration, a $C_{10}$ to $C_{13}$ olefin or a mixture of $C_{10}$ to $C_{13}$ olefins, carbon monoxide, hydrogen and dimethylamine are reacted, at elevated temperature and superatmospheric pressure, in the presence of a minor, catalytic proportion of a cobalt carbonyl tri-n-butyl phosphine compound represented by the empirical formula $Co_2(CO)_6PBu_3)_2$, to form preponderant amounts of $C_{11-14}$-alkyldimethylamines accompanied by the production of large amounts of $C_{11-14}$-alcohols. The amines may be separated from the alcohols by extraction with an isopentane-isopropyl alcohol-aqueous hydrochloric acid system.

While the reaction proceeds to all practical purposes as a single-step process in a unitary reaction zone, the exact mechanism whereby, for example, a $C_{11}$-alkyldimethyl amine is formed from a $C_{10}$-olefin is not known with certainty. It may be formed via the initial formation of a $C_{11}$-n-aldehyde, hydrogenation through the catalytic action of the complex catalyst to the $C_{11}$-alcohol, and an aminolysis reaction with the secondary amine to form the alkyl dimethyl tertiary amine. On the other hand, condensation of the aldehyde and amine and either catalytic hydrogenolysis of the C-hydroxyl group to C—H or dehydration followed by hydrogenation might be involved. The entire process is effected fairly rapidly and under known hydroformylation reaction conditions.

While cobalt carbonyl tri-n-butyl phosphine has been described as an especially useful catalyst, other complex cobalt catalysts can be used in the process of the present invention. A preferred class of such catalyst is cobalt carbonyl phosphines in which the phosphines are trihydrocarbon phosphines, $R_3P$, where the R's are independently selected from aliphatic (acyclic or alicyclic) and aromatic hydrocarbon radicals containing up to 18 carbon atoms per radical and preferably with a total of up 30 carbon atoms in the phosphine.

The complex cobalt catalysts for use in the process of this invention may be prepared by a diversity of methods. A convenient method is to prepare the catalyst separately from the components thereof. This may be accomplished by combining a cobalt salt with tributyl phosphine in liquid phase. The valence state of the cobalt may then be reduced by hyrogenating the solution. Alternatively, the catalyst may be prepared in situ in the reaction zone by simply supplying the components in proportions required to give the desired ratios of cobalt to phosphine. Under this method, tributyl phosphine and an organic or inorganic cobalt salt such as an acetate, sulfate, chloride or the like are present when the hydrogen and carbon monoxide gases are pressured into the reaction zone, thus forming the catalyst in situ. This latter method was utilized in the preparation of the catalysts used in the examples hereinafter described.

Even though, for purposes of illustration and description, a $C_{10}$ to $C_{13}$ olefin is suggested herein as an especially useful feed material for producing amines, it is also contemplated that from $C_6$ to $C_{20}$ olefins and various mixtures thereof may be hydroformylated and processed in a direct, single-step process to form the amines set forth hereinbefore. Moreover, the process of this invention yields mostly n-alkylamines from various n-alkenes regardless of the position of the olefinic double bond. This is of especial value in the manufacture of n-alkylamines from mixtures of terminal and internal olefins, for example, such mixtures which result from the thermal or catalytic cracking of paraffins, e.g., pyrolysis of paraffin waxes and of urea extracts from heavy gas oils.

With tertiary amines being the desired product, the best results are obtained employing a secondary amine. Lower secondary amines, with alkyls of 1 to 4 carbon atoms, such as dimethyl amine, methyl ethyl amine, diethyl amine, and dipropyl amine are suitable, with dimethyl amine being preferred. However, higher alkyl secondary amines may be used if desired.

The reaction temperatures may vary over relatively wide limits, as from about 100° C. to about 250° C., for a contact time of from 1 to 22 hours; with a preferred range being from 160° C. to 220° C. for a contact time of 2 to 6 hours.

The reaction is generally carried out at superatmospheric pressure of at least 100 p.s.i.g., usually within the range of from 100 to 3000 p.s.i.g., with a pressure range of from about 500 to about 2000 p.s.i.g. being preferred.

The invention will be more fully understood by consideration of the following examples which are given to illustrate the practice and advantages of the invention and should not be construed to limit the invention since the variation of certain factors will be well understood by those skilled in the art.

*Example I*

A 300-ml. stainless steel magnetically agitated autoclave was charged with a cobalt octoate-hydrocarbon solution containing 1% wt. cobalt as the octoate. The hydrocarbon was a mixture of $C_{10}$ to $C_{13}$-olefins. To this mixture was added tributyl phosphine and dimethyl amine. The mole ratio of the phosphine to the cobalt was between 1 and 2. The autoclave was pressured with a hydrogen and carbon monoxide gaseous mixture up to a pressure of 1100–1200 p.s.i., the $H_2$:CO mole ratio being 2.25. The autoclave was then heated to a temperature of 199° C. for a period of two hours. Additional gas was added as necessary to maintain the required pressure. The dimethylamine:olefin mole ratio was 2.

The reacted solution was distilled into two cuts. The first cut contained unreacted dimethylamine and the second cut was composed of everything distilling up to a kettle temperature of 200° C. at 2 mm. Hg. The catalyst residue remained as bottoms.

Approximately a 100% excess of dilute HCl was added to the second cut. This mixture was shaken and a stable emulsion formed. Isopentane, in an amount about equal to one quarter of the dilute HCl, was added. The stable emulsion remained. An amount of isopropyl alcohol about equal to the isopentane was added. Upon shaking, two separate layers were formed.

The upper or isopentane layer contained the alcohols and hydrocarbons. The lower layer contained isopropyl alcohol, water and the hydrochloride salt of the amines. After extraction with isopentane to insure complete removal of any alcohols and/or other hydrocarbons, a sodium hydroxide solution was added to the separated lower layer. Two layers were formed, the upper layer containing the amines.

The over-all conversion of olefin was 88%. The yield of $C_{11}$–$C_{14}$ n-alkyl dimethyl amine based upon the olefin reacted was 48%. Approximately 42% of the olefin reacted was converted to alcohol.

*Example II*

A reaction was carried out as outlined in Example I with the exception that the $H_2$:CO mole ratio was 1.10. The over-all conversion of olefin was 79%. The yield of $C_{11}$–$C_{14}$ n-alkyl dimethylamine based upon the olefin reacted was 41%. Approximately 14% of the olefin reacted was converted to alcohol. The balance of the product was dimethyl formamide (from carbonylation of dimethylamine), aldehydes and saturated hydrocarbons (from hydrogenation of olefin).

*Example III*

A reaction system as in Example I was charged with a mixture of $C_{10}$–$C_{13}$ olefins and sufficient cobalt carbonyl tributylphosphine (ratio of cobalt to phosphine=1) catalyst complex to give approximately 1% w. cobalt in the solution. The reaction was carried out at 200–214° C., 1800–1860 p.s.i.g., $H_2$:CO mole ratio of 1.74 and dimethylamine:olefin mole ratio of 2. The residence time in the unit was two hours. The separation and extraction process was carried out as outlined in Example I. The over-all conversion of olefin was 84%. The yield of $C_{11}$–$C_{14}$ n-alkyl dimethyl amine based upon the olefin reacted was 46%.

*Example IV*

An autoclave was charged with a mixture of $C_{10}$–$C_{13}$ olefins and sufficient cobalt carbonyl tributylphosphine (ratio of cobalt to phosphine=1) catalyst complex to give approximately 1% w. cobalt in the solution. The reaction was carried out at 200° C., 1100–1200 p.s.i.g., $H_2$:CO mole ratio of 1.76, and dimethylamine:olefin mole ratio of 4. The residence time in the unit was six hours. The separation and extraction process was carried out as outlined in Example I. The over-all conversion of olefin was 75%. The yield of $C_{11}$–$C_{14}$ n-alkyl dimethyl amine, based upon the olefin reacted, was 46%. Approximately 22% of the olefin reacted was converted to alcohol.

*Example V*

A reaction was carried out as outlined in Example IV, with the exception that the temperature was 180° C. The over-all conversion of olefin was 67%. The yield of $C_{11}$–$C_{14}$ n-alkyl dimethyl amine, based upon the olefin reacted was 45%. Approximately 14% of the olefine reacted was converted to alcohol.

*Example VI*

A reaction was carried out as outlined in Example IV, with the exception that the dimethylamine:olefin mole ratio was 1. The over-all conversion of olefin was 97%. The yield of $C_{11}$–$C_{14}$ n-alkyl dimethyl amine, based upon the olefin reacted, was 40%. Approximately 27% of the olefin reacted was converted to alcohol.

*Example VII*

A reaction was carried out as outlined in Example V, with the exception that the dimethylamine:olefin mole ratio was 2. The over-all conversion of olefin was 77%. The yield of $C_{11}$–$C_{14}$ n-alkyl dimethyl amine, based upon the olefin reacted, was 42%. Approximately 18% of the olefin reacted was converted to alcohol.

We claim as our invention:

1. The process for the production of a tri-alkyl amine which consists essentially of reacting a mono-olefinic hydrocarbon having up to twenty carbon atoms to the molecule with carbon monoxide, hydrogen and a di-alkyl amine at a temperature from about 100 to about 250° C., and a pressure of from about 100 to about 3000 p.s.i.g. in the presence of a catalyst consisting essentially of cobalt carbonyl tri-hydrocarbon phosphine, wherein each of the hydrocarbon radicals in said tri-hydrocarbon phosphine is a member of the group consisting of acyclic aliphatic, alicyclic aliphatic and aromatic hydrocarbon radicals, wherein said tri-hydrocarbon phosphine contains a total of up to thirty carbon atoms and wherein the total number of carbon atoms in any one of said hydrocarbon radicals in said tri-hydrocarbon phosphine does not exceed eighteen.

2. The process for the production of a tri-alkyl amine having two alkyl groups of one to four carbons and an alkyl group of seven to twenty-one carbons, which consists essentially of reacting a mono-olefinic hydrocarbon having from six to twenty carbon atoms to the molecule with carbon monoxide, hydrogen and a di-alkyl amine wherein the alkyl groups of said di-alkyl amine have from one to four carbon atoms, at a temperature of from about 100 to about 250° C., and a pressure of from about 100 to about 3000 p.s.i.g., in the presence of a cobalt catalyst consisting essentially of cobalt carbonyl tri-alkyl phosphine, wherein said tri-alkylphosphine contains a total of up to thirty carbon atoms, and wherein the total number of carbon atoms in any one of the alkyl groups in said tri-alkyl phosphine does not exceed eighteen.

3. The process for the production of a tri-alkyl amine having two alkyl groups of one to four carbons and an alkyl group of seven to twenty-one carbons, which consists essentially of reacting a mono-olefinic hydrocarbon having from six to twenty carbon atoms to the molecule with carbon monoxide, hydrogen and a di-alkyl amine wherein the alkyl groups of said di-alkyl amine have from one to four carbon atoms, at a temperature of from about 100 to about 250° C. and a pressure of from about 100 to about 3000 p.s.i.g., in the presence of a cobalt carbonyl tri-butylphosphine 4. The process for the production of a higher alkyl di-methyl amine wherein said higher alkyl group contains from seven to twenty-one carbon atoms, which consists essentially of reacting a mono-olefinically unsaturated hydrocarbon having from six to twenty carbon atoms with carbon monoxide, hydrogen, and dimethyl amine, at a temperature of from about 100 to about 250° C., and a pressure of from about 100 to about 3000 p.s.i.g. in the presence of cobalt carbonyl tri-(n-butyl) phosphine.

5. The process for the production of a higher alkyl dimethyl amine wherein said higher alkyl group contains from eleven to fourteen carbon atoms, which consists essentially of reacting a mono-olefinically unsaturated hydrocarbon having from ten to thirteen carbon atoms with carbon monoxide, hydrogen, and dimethyl amine, at a temperature of from about 100 to about 250° C., and a pressure of from about 100 to about 3000 p.s.i.g., in the presence of a cobalt catalyst consisting essentially of cobalt carbonyl tri-(n-butyl)phosphine.

6. The process for the production of an admixture of tri-alkyl amines having two alkyl groups of one to four carbon atoms and an alkyl group of seven to twenty-one carbons, which consists essentially of reacting a mixture of mono-olefinic hydrocarbons having from six to twenty carbon atoms with carbon monoxide, hydrogen and a di-alkylamine wherein the alkyl groups of said dialkyl amine have from one to four carbon atoms, at a temperature of from about 100 to about 250° C., and a pressure of from about 100 to about 3000 p.s.i.g., in the presence of a cobalt catalyst consisting essentially of cobalt carbonyl tri-hydrocarbon phosphine, wherein each of the hydrocarbon radicals in said tri-hydrocarbon phosphine is a member of the group consisting of acyclic aliphatic, alicyclic aliphatic and aromatic hydrocarbon radicals, wherein said tri-hydrocarbon phosphine contains a total of up to thirty carbon atoms and wherein the total number of carbon atoms in any one of said hydrocarbon radicals in said tri-hydrocarbon phosphine does not exceed eighteen, thereby forming a reaction mixture comprising alkanols having from seven to twenty-one carbon atoms and said admixture of trialkyl amines and separating said admixture of tri-alkyl amines from said reaction mixture.

7. The process for the production of an admixture of tertiary alkyl amines consisting essentially of higher alkyl dimethyl amines in which said higher alkyl group contains from eleven to fourteen carbons, which consists essentially of reacting a mixture of mono-olefinic hydrocarbons having from ten to thirteen carbon atoms, with carbon monoxide, hydrogen and dimethyl amine, at a temperature of from about 100 to about 250° C. and a pressure of from about 100 to about 3000 p.s.i.g., in the presence of a cobalt catalyst consisting essentially of cobalt carbonyl tributylphosphine, thereby forming a reaction mixture containing alkanols having eleven to fourteen carbon atoms and said admixture of tertiary alkyl amines, and separating said admixture of said tertiary alkyl amines from said reaction mixture.

References Cited by the Examiner
UNITED STATES PATENTS 2,073,671   3/1937   Andrews _____ 260—583
2,497,310   2/1950   Larson _____ 260—583

CHARLES B. PARKER, *Primary Examiner.*